United States Patent
Van Hove et al.

(10) Patent No.: US 9,555,572 B2
(45) Date of Patent: Jan. 31, 2017

(54) INTEGRALLY BLOW-MOULDED BAG-IN-CONTAINER COMPRISING AN INNER LAYER AND AN OUTER LAYER COMPRISING ENERGYABSORBING ADDITIVES, PREFORM FOR MAKING IT AND PROCESS FOR PRODUCING IT

(75) Inventors: Sarah Van Hove, Boutersem (BE); Daniel Peirsman, Bornem (BE); Rudi Verpoorten, Lommel (BE)

(73) Assignee: Anheuser-Busch InBev S.A., Brussels (BE)

( * ) Notice: Subject to any disclaimer, the term of this patent is extended or adjusted under 35 U.S.C. 154(b) by 1025 days.

(21) Appl. No.: 12/450,893

(22) PCT Filed: Apr. 18, 2008

(86) PCT No.: PCT/EP2008/054766
§ 371 (c)(1),
(2), (4) Date: May 19, 2010

(87) PCT Pub. No.: WO2008/129013
PCT Pub. Date: Oct. 30, 2008

(65) Prior Publication Data
US 2010/0227089 A1    Sep. 9, 2010

(51) Int. Cl.
*B29C 49/22* (2006.01)
*B32B 27/08* (2006.01)
(Continued)

(52) U.S. Cl.
CPC ............... *B29C 49/06* (2013.01); *B29B 11/14* (2013.01); *B65D 23/02* (2013.01);
(Continued)

(58) Field of Classification Search
CPC .............. B29B 2911/14113; B29B 2911/1414; B29C 2045/1601; B29C 45/1684; B29C 49/06; B29C 49/221; B29K 2067/11; B65D 23/02; B65D 83/0055; Y10T 29/53335; Y10T 428/1352; Y10T 428/1355; Y10T 428/1359; Y10T 428/1334; Y10S 220/913; Y10S 215/902; B05B 11/0043
(Continued)

(56) References Cited

U.S. PATENT DOCUMENTS 3,450,254 A    6/1969  Miles
3,484,011 A   12/1969  Greenhalgh et al.
(Continued)

FOREIGN PATENT DOCUMENTS

EP    1 245 499    10/2002
EP    1356915      10/2003
(Continued)

*Primary Examiner* — Lee Sanderson
(74) *Attorney, Agent, or Firm* — Levy & Grandinetti (57) ABSTRACT

The present invention relates to an integrally blow-moulded bag-in-container (2) and preform(1, 1') for blow-moulding the bag-in-container. An inner layer (11) and an outer layer (12) are used, wherein the preform forms a two-layer container upon blow-moulding, and wherein the obtained inner layer of said container releases from the thus obtained outer layer upon introduction of a gas at a point of interface (14) between the two layers. At least one of the inner and outer layers includes at least one additive allowing both inner and outer layers to reach their respective blow-moulding temperatures substantially simultaneously.

17 Claims, 3 Drawing Sheets

(51) Int. Cl.
    *B29C 49/06*     (2006.01)
    *B29B 11/14*     (2006.01)
    *B65D 23/02*     (2006.01)
    *B65D 83/00*     (2006.01)
    *B29C 45/16*     (2006.01)
    *B29C 35/08*     (2006.01)
    *B29K 23/00*     (2006.01)
    *B29K 67/00*     (2006.01)
    *B29K 77/00*     (2006.01)
    *B29K 105/00*     (2006.01)

(52) U.S. Cl.
    CPC .. B65D 83/0055 (2013.01); *B29B 2911/1408* (2013.01); *B29B 2911/1414* (2013.01); *B29B 2911/1444* (2013.01); *B29B 2911/14053* (2013.01); *B29B 2911/14066* (2013.01); *B29B 2911/14093* (2013.01); *B29B 2911/14113* (2013.01); *B29B 2911/14326* (2013.01); *B29B 2911/14333* (2013.01); *B29B 2911/14646* (2013.01); *B29C 45/1684* (2013.01); *B29C 49/221* (2013.01); *B29C 2035/0822* (2013.01); *B29C 2045/1601* (2013.01); *B29K 2023/06* (2013.01); *B29K 2023/065* (2013.01); *B29K 2023/086* (2013.01); *B29K 2023/12* (2013.01); *B29K 2067/00* (2013.01); *B29K 2067/046* (2013.01); *B29K 2077/00* (2013.01); *B29K 2105/005* (2013.01); *B29K 2105/0032* (2013.01); *Y10T 428/1352* (2015.01)

(58) Field of Classification Search
    USPC ........ 215/12.1, 380, 12.2, 385, 902; 222/94, 222/105, 106, 386.5, 95, 107, 387, 389, 222/401; 428/35.7, 542.8
    See application file for complete search history.

(56) References Cited

U.S. PATENT DOCUMENTS

| | | | |
|---|---|---|---|
| 4,147,278 A * | 4/1979 | Uhlig | B65D 83/0055 222/400.8 |
| 4,233,010 A | 11/1980 | Suzuki | |
| 4,250,078 A | 2/1981 | McFarlane et al. | |
| 4,330,066 A | 5/1982 | Berliner | |
| 4,408,004 A | 10/1983 | Pengilly | |
| 4,476,272 A | 10/1984 | Pengilly | |
| 4,609,516 A | 9/1986 | Krishnakumar et al. | |
| 4,863,665 A | 9/1989 | Schad et al. | |
| 4,892,230 A | 1/1990 | Lynn, Jr. | |
| 5,242,085 A | 9/1993 | Richter et al. | |
| 5,301,838 A * | 4/1994 | Schmidt et al. | 222/95 |
| 5,332,121 A | 7/1994 | Schmidt et al. | |
| 5,344,045 A | 9/1994 | Richter et al. | |
| 5,407,629 A | 4/1995 | Schmidt et al. | |
| 5,529,744 A | 6/1996 | Tindale | |
| 5,921,416 A * | 7/1999 | Uehara | B29C 49/18 215/12.1 |
| 5,925,710 A | 7/1999 | Wu et al. | |
| 6,034,167 A | 3/2000 | Tung et al. | |
| 6,197,851 B1 | 3/2001 | Maxwell et al. | |
| 6,238,201 B1 | 5/2001 | Safian | |
| H0002018 H * | 4/2002 | Giaimo et al. | 428/35.7 |
| 6,503,586 B1 | 1/2003 | Wu et al. | |
| 6,602,568 B2 | 8/2003 | Semersky | |
| 6,649,121 B1 | 11/2003 | Hamamoto et al. | |
| 7,253,422 B2 | 8/2007 | Smith | |
| 2009/0206524 A1* | 8/2009 | Laidler et al. | 264/516 |

FOREIGN PATENT DOCUMENTS

| | | |
|---|---|---|
| EP | 1 593 605 | 11/2005 |
| JP | 57-174221 | 10/1982 |
| JP | 05-213373 | 8/1993 |
| JP | 08-001761 | 1/1996 |
| JP | 09-208688 | 8/1997 |
| JP | 10-128833 | 5/1998 |
| JP | 10-180853 | 7/1998 |
| JP | 10180853 A * | 7/1998 |
| JP | 11-010719 | 1/1999 |
| JP | 2000 062745 | 2/2000 |
| JP | 2005/047172 | 2/2005 |
| WO | WO 91/08099 | 6/1991 |

\* cited by examiner

INTEGRALLY BLOW-MOULDED BAG-IN-CONTAINER COMPRISING AN INNER LAYER AND AN OUTER LAYER COMPRISING ENERGY ABSORBING ADDITIVES, PREFORM FOR MAKING IT AND PROCESS FOR PRODUCING IT

The Applicants claim priority to International Application Number PCT/EP2008/054766, filed on Apr. 18, 2008, and U.S. application Ser. No. 11/785,749, filed on Apr. 19, 2007.

FIELD OF THE INVENTION

The present invention relates in general to new developments in dispensing bag-in-containers and, in particular, to integrally blow-moulded bag-in-containers made of different materials. It also relates to a method for producing the bag-in-containers and, in particular, to preforms used for their production, as well as a method for producing said preform.

BACKGROUND OF THE INVENTION

Bag-in-containers, also referred to as bag-in-bottles or bag-in-boxes depending on the geometry of the outer vessel, all terms considered herein as being comprised within the meaning of the term bag-in-container, are a family of liquid dispensing packaging consisting of an outer container comprising an opening to the atmosphere—the mouth—and which contains a collapsible inner bag joined to said container and opening to the atmosphere at the region of said mouth. The system must comprise at least one vent fluidly connecting the atmosphere to the region between the inner bag and the outer container in order to control the pressure in said region to squeeze the inner bag and thus dispense the liquid contained therein.

Traditionally, bag-in-containers were—and still are—produced by independently producing an inner bag provided with a specific neck closure assembly and a structural container (usually in the form of a bottle). The bag is inserted into the fully formed bottle opening and fixed thereto by means of the neck closure assembly, which comprises one opening to the interior of the bag and vents fluidly connecting the space between bag and bottle to the atmosphere. Examples of such constructions can be found inter alia in U.S. Pat. Nos. 3,484,011, 3,450,254, 4,330,066, and 4,892,230. These types of bag-in-containers have the advantage of being reusable, but they are very expensive and labour-intensive to produce.

More recent developments focused on the production of "integrally blow-moulded bag-in-containers" thus avoiding the labour intensive step of assembling the bag into the container, by blow-moulding a polymeric multilayer preform into a container comprising an inner layer and an outer layer, such that the adhesion between the inner and the outer layers of the thus produced container is sufficiently weak to readily delaminate upon introduction of a gas at the interface. The "inner layer" and "outer layer" may each consist of a single layer or a plurality of layers, but can in any case readily be identified, at least upon delamination. Said technology involves many challenges and many alternative solutions were proposed.

The multilayer preform may be extruded or injection moulded (cf. U.S. Pat. No. 6,238,201, JPA10128833, JPA11010719, JPA9208688, U.S. Pat. No. 6,649,121. When the former method is advantageous in terms of productivity, the latter is preferable when wall thickness accuracy is required, typically in containers for dispensing beverage.

The formation of the vents fluidly connecting the space or interface between bag and bottle to the atmosphere remains a critical step in integrally blow-moulded bag-in-containers and several solutions were proposed in e.g., U.S. Pat. Nos. 5,301,838, 5,407,629, JPA5213373, JPA8001761, EPA1356915, U.S. Pat. No. 6,649,121, JPA10180853.

One redundant problem with integrally blow-moulded bag-in-containers is the choice of materials for the inner and outer layers which must be selected according to strict criteria of compatibility in terms of processing on the one hand and, on the other hand, of incompatibility in terms of adhesion. These criteria are sometimes difficult to fulfil in combination as illustrated below. This problem does not arise in the field of blow-moulding co-layer plastic containers, wherein the adhesion between layers is maximized in order to avoid delamination, because best adhesion is obtained with similar materials, which generally have similar thermal properties. Consequently, finding materials being compatible in terms of both processing and adhesion as for the fabrication of co-layer containers is generally less problematic than finding materials being compatible in terms of processing and incompatible in terms of adhesion as for the fabrication of bag-in-containers.

Addressing processing compatibility, EPA1356915 and U.S. Pat. No. 6,649,121 proposed that the melting temperature of the outer layer should be higher than the one of the inner layer in order to allow production of integral preforms by injection moulding the outer layer first, followed by injecting thereover the inner layer. Examples of materials for the outer layer given by the authors include PET and EVOH, whilst polyethylene is given as an example for the inner layer. Though this materials selection could result advantageous for the injection moulding production of the preforms, it is far from optimal for the blow-moulding step since polyethylene and PET are characterized by quite different blow-moulding temperatures. Again, in U.S. Pat. No. 6,238,201 a method is described including co-extruding a two layer parison followed by blow-moulding said parison into a bag-in-container wherein the outer layer preferably comprises an olefin and the inner layer an amorphous polyamide.

Concerning the materials choice for a weak interfacial adhesion required for ensuring proper delamination of the inner layer from the outer layer upon use, mention is made in JPA2005047172 of "mutually non-adhesive synthetic resins." In the review of the background art in U.S. Pat. No. 5,921,416 the use of release layers interleafed between inner and outer layers, forming three- or five-layer structures is mentioned. An example of such construction is described in U.S. Pat. No. 5,301,838 which discloses a complex five layer preform comprising three PET layers interleafed by two thin layers of a material selected from the group of EVOH, PP, PE, PA6. Here again, beside the complexity involved with the production of such preforms, substantial differences in blow-moulding temperatures characterize these different materials.

Alternatively and surprisingly it has been discovered that excellent delamination results between the inner and outer layers can be obtained also with preforms wherein both inner and outer layers consist of the same material. Similar results were obtained both with preform assemblies as well as with integral preforms. In the case of integral, over-moulded preforms, it is generally believed that better results are obtained with semi-crystalline polymers.

The same polymer is considered in contact on either side of the interface between the inner and outer layers in the following cases:

inner and outer layers consist of the same material (e.g., $PET_{inner}$-$PET_{outer}$, regardless of the specific grade of each PET); or the inner and outer layers consist of a blend or copolymer having at least one polymer in common, provided said polymer in common is at the interface, whilst the differing polymer is substantially absent of said interface (e.g., $(0.85\ PET+0.15\ PA6)_{inner}(0.8\ PET+0.2\ PE)_{outer}$.

The presence in a layer of low amounts of additives is not regarded as rendering the material different, so far as they do not alter the interface substantially.

Although in case the same material is used for the inner and outer layers, there is no difference in blow-moulding temperature between layers, the heating rate of the two layers can be substantially different due to the wide difference in thicknesses between the inner and outer layers. Moreover, the inner layer is sheltered by the thick, outer layer from the IR-radiation of the IR-oven usually used to bring the preform to blow-moulding temperature. It follows that even for materials having little or no difference in blow-moulding temperature, there can be a problem to heat up simultaneously both layers to their process temperatures.

In order to overcome the problem of different blow-moulding temperatures or heating rates of the materials forming the inner and outer layers of blow-moulded multi-layer containers, the different preform components may be heated separately in different ovens to heat them at their respective blow-moulding temperature (cf. e.g., JPA57174221). This solution, however, is expensive in terms of equipment and space and does not apply to integral preforms, which inner and outer layers cannot be separated.

The use of energy absorbing additives in preforms for blow-moulding monolayer containers has been proposed for shortening the heating stage and thus saving energy in, e.g., U.S. Pa. Nos. 5,925,710, 6,503,586, 6,034,167, 4,250,078, 6,197,851, 4,476,272, 5,529,744, and the likes. The use of energy absorbing additives has also been proposed in the inner layer of blow-moulded co-layer containers (i.e., not meant to delaminate) to compensate for the greater strain undergone by the inner layer compared with the outer layer during blow-moulding operation. In co-layer containers it is very important that the inner layer is allowed to stretch sufficiently to contact and adhere to the outer layer over substantially the whole of their interface. The inner layer containing the energy absorbing additives is thus heated to a higher temperature than the outer layer and can be stretched further to adhere to the outer layer.

The above considerations do not apply in the field of bag-in-containers, since a good adhesion between the inner and outer layers is exactly what is to be avoided. Furthermore, preforms for the production of integrally blow-moulded bag-in-containers clearly differ from preforms for the production of blow-moulded co-layered containers, wherein the various layers of the container are not meant to delaminate, in the thickness of the layers. A bag-in-container is comprised of an outer structural envelope containing a flexible, collapsible bag. It follows that the outer layer of the container is substantially thicker than the inner bag. This same relationship can of course be found in the preforms as well, which are characterized by an outer layer being substantially thicker than the inner layer. This has a detrimental effect on the heating efficacy of IR-lamps on heating the inner layer, since the latter is separated from the IR-lamps by the thick wall of the outer layer.

It follows from the foregoing that there remains a need in the art for solutions for compensating the difference in blow-moulding temperatures and heating rates between the "mutually non-adhesive synthetic resins" (cf. JP2005047172) of the inner and outer layers of a preform for the production of integrally blow-moulded bag-in-containers.

SUMMARY OF THE INVENTION

The present invention is defined in the appended independent claims. Preferred embodiments are defined in the dependent claims. In particular the present invention relates to a preform for blow-moulding a bag-in-container. An inner layer and an outer layer are used, wherein said preform forms a two layer container upon blow-moulding, and wherein the obtained inner layer of the container releases from the thus obtained outer layer upon introduction of a gas at a point of interface between said two layers. At least one of the inner and outer layers includes at least one additive allowing both inner and outer layers to reach their respective blow-moulding temperatures substantially simultaneously when heated together in a single oven.

It also concerns a process for producing a bag-in-container from the above preform and a bag-in-container thus obtained. Finally the present invention relates to the use of energy absorbing additives for the substantially simultaneous heating to the respective blow-moulding temperatures of the inner and outer layers of a preform for blow-moulding a bag-in-container.

DETAILED DESCRIPTION OF THE INVENTION

Figure 1A:
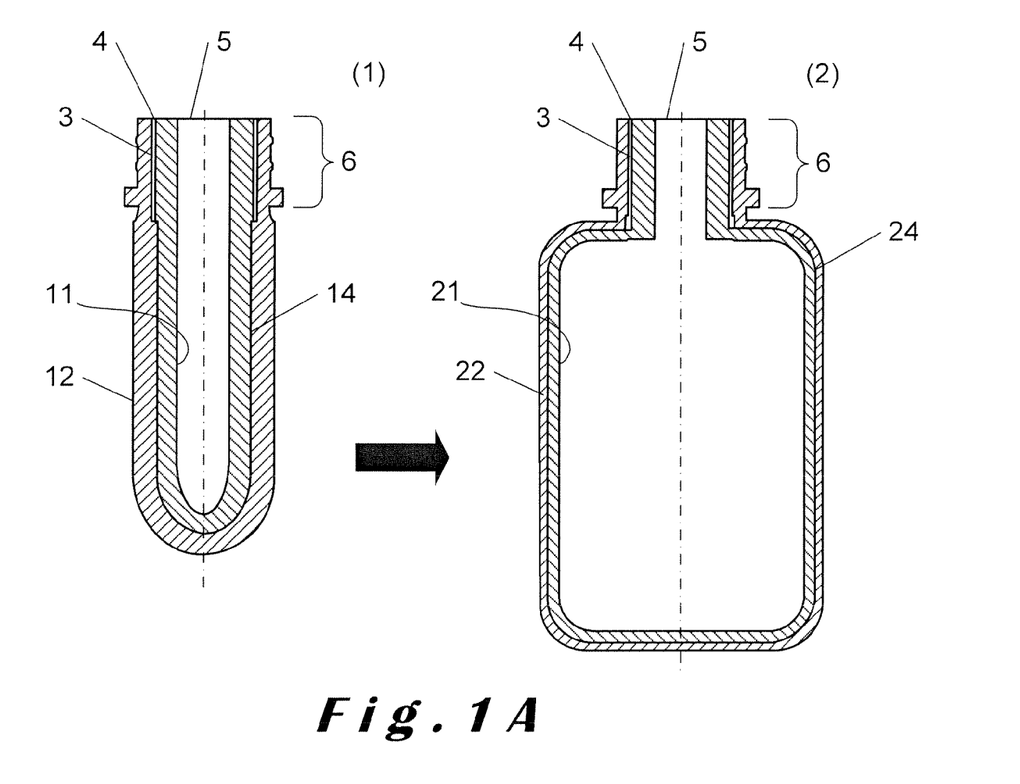
FIG. 1A is a schematic cross-sectional representation of a first embodiment of a preform according to the present invention and the bag-in-container obtained after blow-moulding thereof.
Figure 1B:
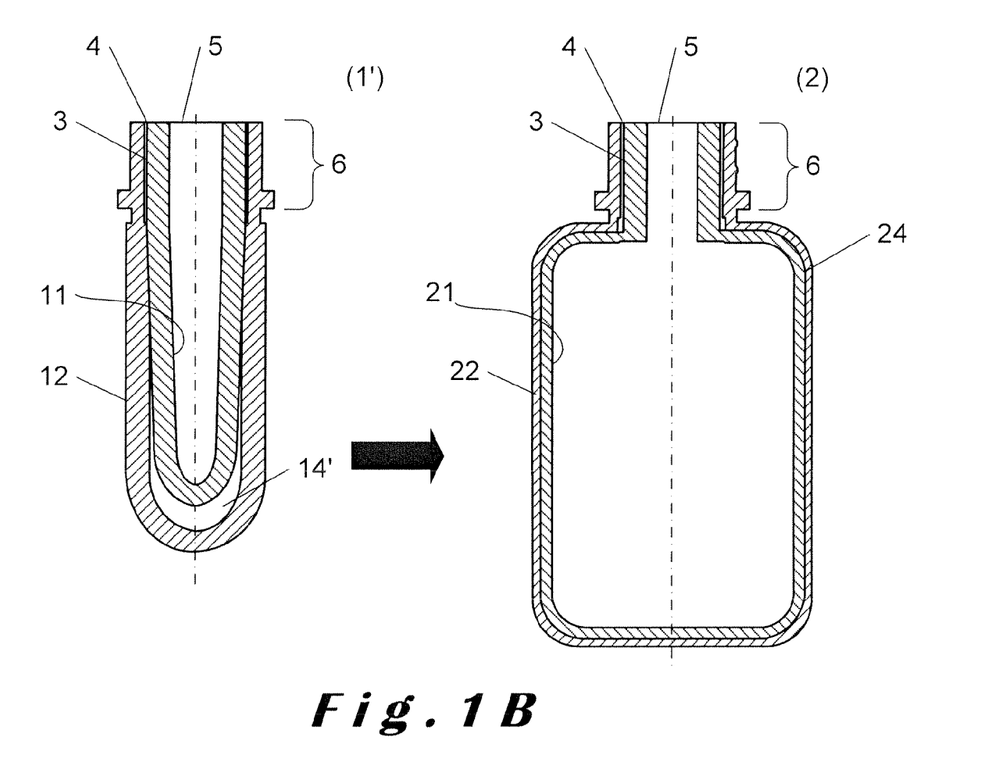
FIG. 1B is a schematic cross-sectional representation of a second embodiment of a preform according to the present invention and the bag-in-container obtained after blow-moulding thereof.

Referring now to appended FIGS. 1A and 1B, there is illustrated an integrally blow-moulded bag-in-container (2) and a preform (1)&(1') for its manufacturing. The preform (1) comprises an inner layer (11) and an outer layer (12) joined at least at the level of the neck region (6) by an interface (shown on the right hand side). The region between inner and outer layers (11) and (12) may either consist of an interface (14) wherein the two layers are substantially contacting each other, or comprise a gap (14') in fluid communication with at least one vent (3) opening to the atmosphere in (4).

Figure 2:
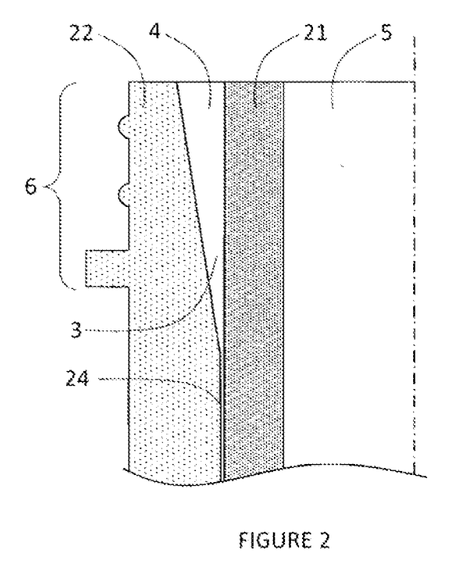
FIG. 2 illustrates a side cut view of a vent in the shape of a wedge.
Figure 3:
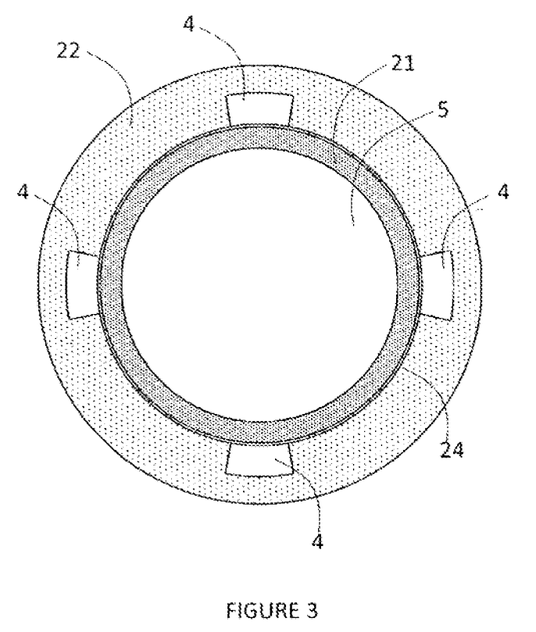
FIG. 3 shows a top view of the mouth of a preform, comprising several vents opening to the atmosphere.

Many vent geometries have been disclosed, and it is not critical which geometry is selected. It is preferred, however, that the vent be located adjacent to, and oriented coaxially with said preform's mouth (5) as illustrated in FIG. 1. More preferably, as illustrated in FIG. 2, the vents have the shape of a wedge with the broad side at the level of the opening (4) thereof and getting thinner as it penetrates deeper into the vessel, until the two layers meet to form an interface (14) at least at the level of the neck region. This geometry allows for a more efficient and reproducible delamination of the inner bag upon use of the bag-in-container. The container may comprise one or several vents evenly distributed around the lip of the bag-in-container's mouth. Several vents are advantageous as the permit they interface of the inner and outer layers (21) and (22) of the bag-in-container (2) to release more evenly upon blowing pressurized gas through said vents. Preferably, the preform comprises two vents opening at the vessel's mouth lip at diametrically opposed positions. More preferably, three and most preferably, at least four vents open at regular intervals of the mouth lip as illustrated in FIG. 3.

The preform may consists of an assembly of two separate preforms (11) and (12) produced independently from one another and thereafter assembled such that the inner preform (11) fits into the outer preform (12). This solution allows for greater freedom in the design of the neck and vents. Alternatively, it can be an integral preform obtained by injection moulding one layer on top of the other. The latter embodiment is advantageous over the assembled preform in that it comprises no assembly step and one production station only is required for the preform fabrication. On the other hand, the design of the vents in particular is restricted by this process.

A preform for the production of a typical 8 liter bag-in-container for dispensing beer has an outer layer (12) about 210 mm thick, preferably 36 mm, most preferably 45 mm thick, whilst the inner layer generally is about 0.33 mm thick, preferably 0.31.5 mm, most preferably 0.51 mm thick Preferred materials for the inner and outer layers of the preform and bag-in-container of the present invention are pairs of different materials selected from the group of polyesters like PET, PEN, PTT, PTN; polyamides like PA6, PA66, PA11, PA12; polyolefins like PE, PP; EVOH; biodegradable polymers like polyglycol acetate (PGAc), polylactic acid (PLA); and copolymers and blends thereof. Materials like PET or PEN should optimally be heated before blow-moulding, whilst polyolefins and polyamides should be heated. In order to allow for the substantially simultaneous heating to the respective process temperatures of the resins of the inner and outer layers of the preform using a single oven, energy absorbing additives are added to the resin having highest process temperature. It is, however, also possible that both layers comprise energy absorbing additives of different nature and/or in different amounts, as long as the time required to arrive at the respective process temperatures of the materials of the inner and outer layers is substantially the same.

The additives that can be used in the present invention may be any compound that selectively absorbs radiation in the wavelength region of 500 to 2000 nm and which is preferably sufficiently fine not to be visible to the eye. They comprise energy absorbing additives and colorants. Examples of energy absorbing additives include but are not limited to carbon black, graphite, diamond dust, diazonium salts, sulphonium salts (e.g., triphenylsulphoniu bromide), sulfoxonium salts, odonium salts, etc.

The amount of additive present in a layer depends on the additive itself and on the resins used for the inner and outer layers. A larger amount may impair stretchability of the layers.

The two layers (11) and (12) of the preform may be connected by an interface (14) throughout substantially the whole inner surface of the outer layer. Inversely, they may be separated over a substantial area of the preform's body by a gap (14) containing air and which is in fluid communication with at least one interface vent (3). The latter embodiment is easier to realize when using a preform assembly designed such that the inner preform is firmly fixed to the outer preform at the neck region (6) and a substantial gap (14) may thus be formed between inner and outer layers (11) and (12).

The bag-in-container (2) of the present invention can be obtained by providing a preform as described above, at least one layer of which comprising energy absorbing additives; bringing each layer of said preform to their respective blow-moulding temperatures; fixing the thus heated preform at the level of the neck region with fixing means in the blow-moulding tool; and blow-moulding the thus heated preform to form a bag-in-container, wherein, the type and amount of energy absorbing additives comprised in at least one of the inner and outer layers of said preform are such that said two layers reach their respective blow-moulding temperatures substantially simultaneously.

The inner and outer layers (21) and (22) of the thus obtained bag-in-container are connected to one another by an interface (24) over substantially the whole of the inner surface of the outer layer. Said interface (24) is in fluid communication with the atmosphere through the vents (3), which maintained their original geometry through the blow-moulding process since the neck region of the preform where the vents are located is held firm by the fixing means and is not stretched during blowing.

It is essential that the interface (24) between inner and outer layers (21) and (22) releases upon blowing pressurized gas through the vents in a consistent and reproducible manner. The success of said operation depends on a number of parameters, in particular, on the interfacial adhesive strength, the number, geometry, and distribution of the vents, and on the pressure of the gas injected. The interfacial strength is of course a key issue and can be modulated by the choice of the material for the inner and outer layers, and by the process parameters during blow-moulding. The pressure-time-temperature window used is of course of prime importance and greatly depends on the materials selected for the inner and outer layers.

Excellent results can be obtained if the blow-moulding process is carried out on a preform as described above, of the type wherein a gap containing air separates the inner and outer layers over a substantial area of the preform's body and wherein said gap is in fluid communication with at least one interface vent and wherein, in a first stage, a gas is blown into the space defined by the inner layer to stretch the preform, whilst the air in the gap separating the preform inner and outer layers is prevented from being evacuated by closing said at least one preform interface vent with a valve located in the fixing means; and in a second stage, when the air pressure building up in said gap reaches a preset value, the valve opens thus allowing evacuation of the air enclosed in the gap.

By this method, the inner layer is prevented from entering into contact with the outer layer by the air cushion enclosed within the gap separating the two layers when their respective temperatures are the highest. As stretching proceeds, the gap becomes thinner and air pressure within the gap increases. When the pressure reaches a preset value, the valve closing the vent opening releases, the air is ejected, and the inner layer is permitted to contact the outer layer and form an interface therewith at a stage where their respective temperatures have dropped to a level where adhesion between the layers cannot build up to any substantial level.

A release agent may be applied at the interface on either or both surfaces of the inner and outer layer, which are to form the interface of the bag-in-container. In the case the outer layer is injection moulded onto the inner layer, the release agent can be applied at the outer surface of the inner layer prior to moulding the outer layer. Any release agents available on the market and best adapted to the material used for the preform and resisting the blowing temperatures, like silicon- or PTFE-based release agents (e.g., Freekote) may be used. The release agent may be applied just prior to loading the preforms into the blowmoulding unit, or the preforms may be supplied pretreated.

The application of a release agent is particularly beneficial with respect to the design of the inner layer. Indeed, lowering the interferential adhesive strength facilitates delamination of the inner layer from the outer layer and hence reduces stress exerted on the inner layer upon delamination, as such the inner layer can be designed very thin and flexible without risking that the inner layer is damaged upon delamination. Clearly, the flexibility of the inner bag is a key parameter for the liquid dispensing and moreover costs savings can be achieved in terms on material savings when the inner layer can be designed very thin.

EXPERIMENTAL EXAMPLES

The following examples demonstrate the benefits of the present invention. Preforms comprising an inner and outer layers made of different materials were heated in an over comprising six IR lamps. The heating conditions were maintained constant for all the tests. The temperatures, $T_{inner}$ and $T_{outer}$, of the inner and outer layers were measured after residence in the oven and the preforms were then blow-moulded with a blow pressure of 10 bar in a mould set a temperature of 83° C.

The delamination pressure was determined as follows. The interface vents of an empty bag-in-container obtained as described above are connected to a source of pressurized air. Air is injected through the vents at a constant pressure and the interface between inner and outer layers is observed; the pressure is increased until delamination pressure is reached. Delamination pressure is defined as the pressure at which the inner bag separates from the outer layer over the whole of their interface and collapses. The surfaces of the thus separated layers are examined for traces of bonding. Preferred results are a low delamination pressure, of the order of above 0.3 to 0.9 bar overpressure, with no traces of bonding.

We claim:

1. A preform for blow-molding a dispensing bag-in-container, said preform comprising:
   a neck region,
   a body portion, wherein each of the neck region and the body portion consists of an inner layer and an outer layer,
   a mouth with a lip defining a perimeter,
   a vent disposed at the neck region, and
   said outer layer adjacent to said inner layer forming an interface in the body portion and the neck region,
   wherein each of said inner layer and said outer layer consists of a single layer comprising PET and one of said inner layer and said outer layer includes an additive allowing both the inner layer and the outer layer to reach their respective blow-molding temperatures substantially simultaneously upon heating said layers together in a single IR oven,
   said preform, upon blow-molding, forms a two-layer bag-in-container comprising a collapsible inner bag contained in an outer container and an interface therebetween for receiving pressurized gas through said vent to dispense a liquid contained therein.

2. The preform according to claim 1, wherein the at least one additive is selected from the group of energy absorbing additives and colorants.

3. The preform according to claim 2, wherein the energy absorbing additive is a member being selected from the group consisting of carbon black, graphite, diamond dust, diazonium salts, sulphonium salts, solfoxonium salts, and iodonium salts.

4. The preform according to claim 1, wherein the inner layer or the outer layer further comprises at least one of the group consisting of: polyethylene naphthalate (PEN), polytrimethylene terephthalate (PTT), polyamide (PA), polypropylene (PP), polyethylene (PE), high density polyethylene (HDPE), ethylene vinyl alcohol (EVOH), polyglycolic acid (PGAc), polylactic acid (PLA), and copolymers or blends thereof.

5. The preform according to claim 1, wherein the at least one vent is in the shape of a wedge having a broad side and a narrow side, wherein said broad side is positioned at the neck and the narrow side is positioned to meet to form the interface.

6. The preform according to claim 5, wherein more than one vent is distributed around the mouth.

7. A bag-in-container dispensing system comprising:
   a single layer inner bag contained in a single layer outer container forming the bag-in-container, said bag-in-container having a neck and body, and
   said bag-in-container having a vent in said neck for receiving a pressurized gas between said inner bag and said outer container to dispense a liquid,
   said bag-in-container made by the process comprising:
      providing a polymer preform according to claim 1;
      heating said preform to blow-molding temperature in a single IR oven; and
      blow-molding the heated preform to form a bag-in-container.

8. The bag-in-container dispensing system of claim 7, further comprising a source of pressurized gas releasably connected to the vent.

9. An integrally blow-molded bag-in-container device suitable for dispensing a liquid comprising:
   (a) an outer container consisting of a single layer comprising PET and having a body portion, a neck region, and a mouth defining a perimeter;
   (b) a collapsible inner bag consisting of a single layer comprising PET, wherein the inner bag is suitable for holding the liquid;
   (c) a vent between the inner bag and the outer container, said vent disposed at the neck region and open to the atmosphere; and
   (d) a source of pressurized gas releasably attached to the vent;
   at least one of said inner bag and said outer container includes an energy absorbing additive to alter the infrared heating profile of the inner bag or outer container;
   said outer container and said inner bag have an interface for receiving pressurized gas through the vent so as to collapse said inner bag and dispense the liquid contained therein.

10. The blow-molded bag-in-container of claim 9, wherein the vent is one of a plurality of vents.

11. The blow-molded bag-in-container of claim 10, wherein the plurality of vents is disposed around the neck region.

12. The blow-molded bag-in-container of claim 9, wherein the inner bag contains a liquid.

13. The blow-molded bag-in-container of claim 12, wherein the liquid is a beverage.

14. A process for producing a bag-in-container suitable for dispensing a liquid contained in an inner bag by introduction of a pressurized gas into an interface between the inner bag and an outer container, said process comprising the following steps:
   heating a preform according to claim 1 to blow-moulding temperature in a single IR oven; and
   blow-moulding the heated preform to form the bag-in-container;
wherein the additive in one of the inner layer and the outer layer of said preform allows said layers to reach their respective blow-moulding temperatures substantially simultaneously.

15. The process according to claim 14, wherein the additive is selected from the group of energy absorbing additives and colorants.

16. The process according to claim 15, wherein the energy absorbing additive is selected from the group of consisting of carbon black, graphite, diamond dust, diazonium salts, sulphonium salts, sulfoxonium salts, and iodonium salts.

17. The process according to claim 14, wherein the oven comprises infrared lamps.

\* \* \* \* \*

UNITED STATES PATENT AND TRADEMARK OFFICE
CERTIFICATE OF CORRECTION

PATENT NO.       : 9,555,572 B2
APPLICATION NO.  : 12/450893
DATED            : January 31, 2017
INVENTOR(S)      : Sarah Van Hove et al.

It is certified that error appears in the above-identified patent and that said Letters Patent is hereby corrected as shown below:

Column 5, Lines 29 through 33, cancel the paragraph beginning with "A preform for the production of" to and ending "most preferably 0.51 mm thick" and insert the following paragraph:
--A preform for the production of a typical 8 liter bag-in-container for dispensing beer has an outer layer (12) about 2 to 10 mm thick, preferably 3 to 6 mm, most preferably 4 to 5 mm thick, whilst the inner layer generally is about 0.3 to 3 mm thick, preferably 0.3 to 1.5 mm, most preferably 0.5 to 1 mm thick.--.

Column 5, Lines 40 through 43, cancel the sentence beginning with "Materials like PET or PEN" to and ending "polyamides should be heated" and insert the following sentence:
--Materials like PET, PEN, polyolefins, and polyamides must be heated before blow-moulding.--.

Column 5, Line 55, cancel the wavelength region of '500 to 2000nm' and replace with -500 to 20,000 nm-.

Signed and Sealed this
Tenth Day of July, 2018

Andrei Iancu
*Director of the United States Patent and Trademark Office*